United States Patent
Iwayama et al.

(10) Patent No.: US 8,305,651 B2
(45) Date of Patent: Nov. 6, 2012

(54) IMAGE READING APPARATUS

(75) Inventors: Akira Iwayama, Ishikawa (JP);
Hiroyuki Maruyama, Ishikawa (JP)

(73) Assignee: PFU Limited, Ishikawa (JP)

( * ) Notice: Subject to any disclaimer, the term of this patent is extended or adjusted under 35 U.S.C. 154(b) by 565 days.

(21) Appl. No.: 12/551,365

(22) Filed: Aug. 31, 2009

(65) Prior Publication Data

US 2010/0103478 A1    Apr. 29, 2010

(30) Foreign Application Priority Data

Oct. 29, 2008   (JP) .................. 2008-278276

(51) Int. Cl.
*H04N 1/04* (2006.01)

(52) U.S. Cl. ......... 358/474; 358/475; 358/496; 358/497

(58) Field of Classification Search .................. 358/474, 358/475, 496, 497, 498
See application file for complete search history.

(56) References Cited

U.S. PATENT DOCUMENTS

2008/0118276 A1 * 5/2008 Ito et al. .................... 399/211

FOREIGN PATENT DOCUMENTS

| JP | 1110552 | 7/1989 |
|---|---|---|
| JP | 06253093 | 9/1994 |
| JP | 2007324903 | 12/2007 |
| JP | 2008-147847 A | 6/2008 |
| JP | 2009118422 | 5/2009 |

OTHER PUBLICATIONS

Japanese Office Action for Application No. JP2008-278276 mailed Mar. 13, 2012.

* cited by examiner

*Primary Examiner* — Houshang Safaipour
(74) *Attorney, Agent, or Firm* — Lowe, Hauptman, Ham & Berner, LLP

(57) ABSTRACT

An image reading apparatus includes a sheet conveyance path on which a sheet of a document from which an image is to be read is conveyable; a light source that emits light to be irradiated on the sheet; a conductive unit through which heat generated at the light source is transferable; and a heat radiating unit that forms a part of the sheet conveyance path, through which the heat transferred from the light source to the conductive unit is propagable, and that radiates the heat propagated from the conductive unit to air flowing in the sheet conveyance path when the sheet is being conveyed.

12 Claims, 8 Drawing Sheets

IMAGE READING APPARATUS

CROSS-REFERENCE TO RELATED APPLICATIONS

This application is based upon and claims the benefit of priority from Japanese Patent Application No. 2008-278276, filed Oct. 29, 2008, the entire contents of which are incorporated herein by reference.

BACKGROUND OF THE INVENTION

1. Field of the Invention

The present invention relates to an image reading apparatus. More particularly, the invention relates to an image reading apparatus including a sheet conveyance mechanism.

2. Description of the Related Art

Generally image reading apparatuses read images on sheets of documents by irradiating the sheets with light emitted from light sources such as light-emitting diodes (LED), and reading the sheets irradiated with the light with reading units such as cameras. The temperature in such image reading apparatuses tend to increase with the heat generated when their light sources and other electronic components are in operation. In recent years, many image reading apparatuses have been downsized. It is difficult, however, to radiate the heat generated in the downsized image reading apparatuses because it is difficult to provide them with heat radiating devices like fans. Therefore, some image reading apparatuses are designed to radiate the heat from their light sources without any additional heat radiating devices.

For example, such an image reading apparatus is proposed in Japanese Patent Application Laid-open No. 2008-147847. The Application relates to a linear light source apparatus and an image reading apparatus employing LEDs as light sources. According to the Application, two LEDs are mounted on two boards opposite to each other, so that the LEDs face each other. Between the two LEDs, a light guide member having ends close to the two boards is provided. Near the light guide member, a heat radiating member is provided, which extends along the light guide member, and has ends supported by the two boards. Consequently, a sheet of a document is irradiated with light emitted from the LEDs and incident via the light guide member when the LEDs are turned on. Heat generated when the LEDs are on is transferred to the heat radiating member to be radiated by the heat radiating member. Therefore, with this simple structure, it is possible to radiate the heat generated at the LEDs serving as the light sources to some extent without any additional heat radiating device.

However, when the heat generated at the light sources are transferred to the heat radiating member, the heat radiated by the heat radiating member raises the temperature of the air around the heating radiating member. Once this temperature increases, the temperature difference between the heat radiating member and the air becomes small. Consequently, it becomes difficult for the heat generated at the LEDs to effectively radiate through the heat radiating member.

SUMMARY OF THE INVENTION

According to an aspect of the invention, an image reading apparatus includes a sheet conveyance path on which a sheet of a document from which an image is to be read is conveyable; a light source that emits light to be irradiated on the sheet; a conductive unit through which heat generated at the light source is transferable; and a heat radiating unit that forms a part of the sheet conveyance path, through which the heat transferred from the light source to the conductive unit is propagable, and that radiates the heat propagated from the conductive unit to air flowing in the sheet conveyance path when the sheet is being conveyed.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of an image reading apparatus according to the present invention are described below in detail with reference to the accompanying drawings. The embodiments do not limit the present invention, and elements disclosed in the embodiments include elements that can be easily substituted by those skilled in the art and also elements that are substantially the same.

First Embodiment

Figure 1:
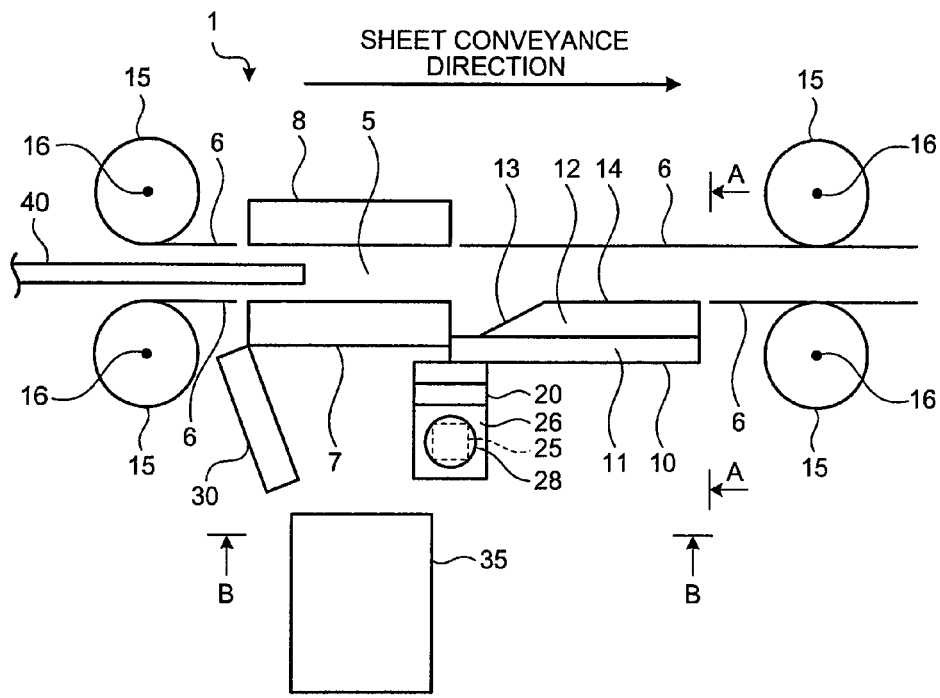
FIG. 1 is a schematic diagram of an image reading apparatus according to a first embodiment of the present invention.
Figure 2:
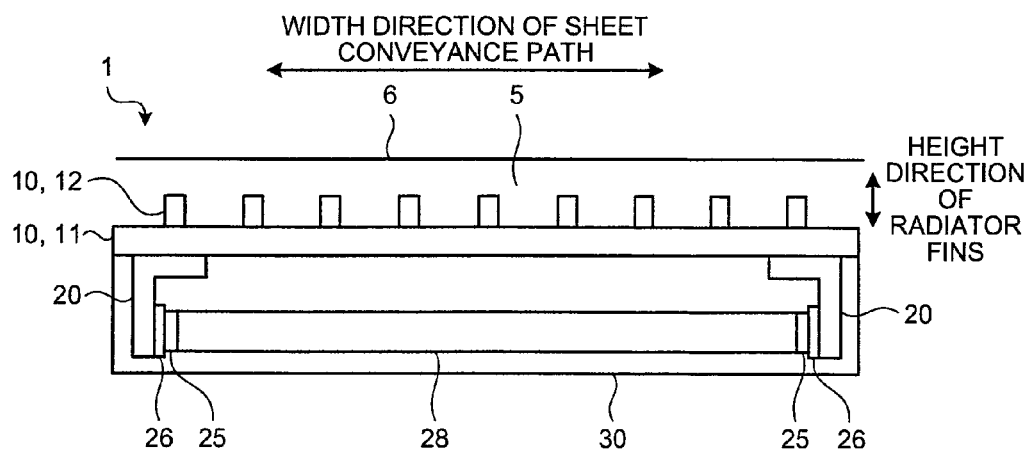
FIG. 2 is a view in the direction of arrows A in FIG. 1.
Figure 3:
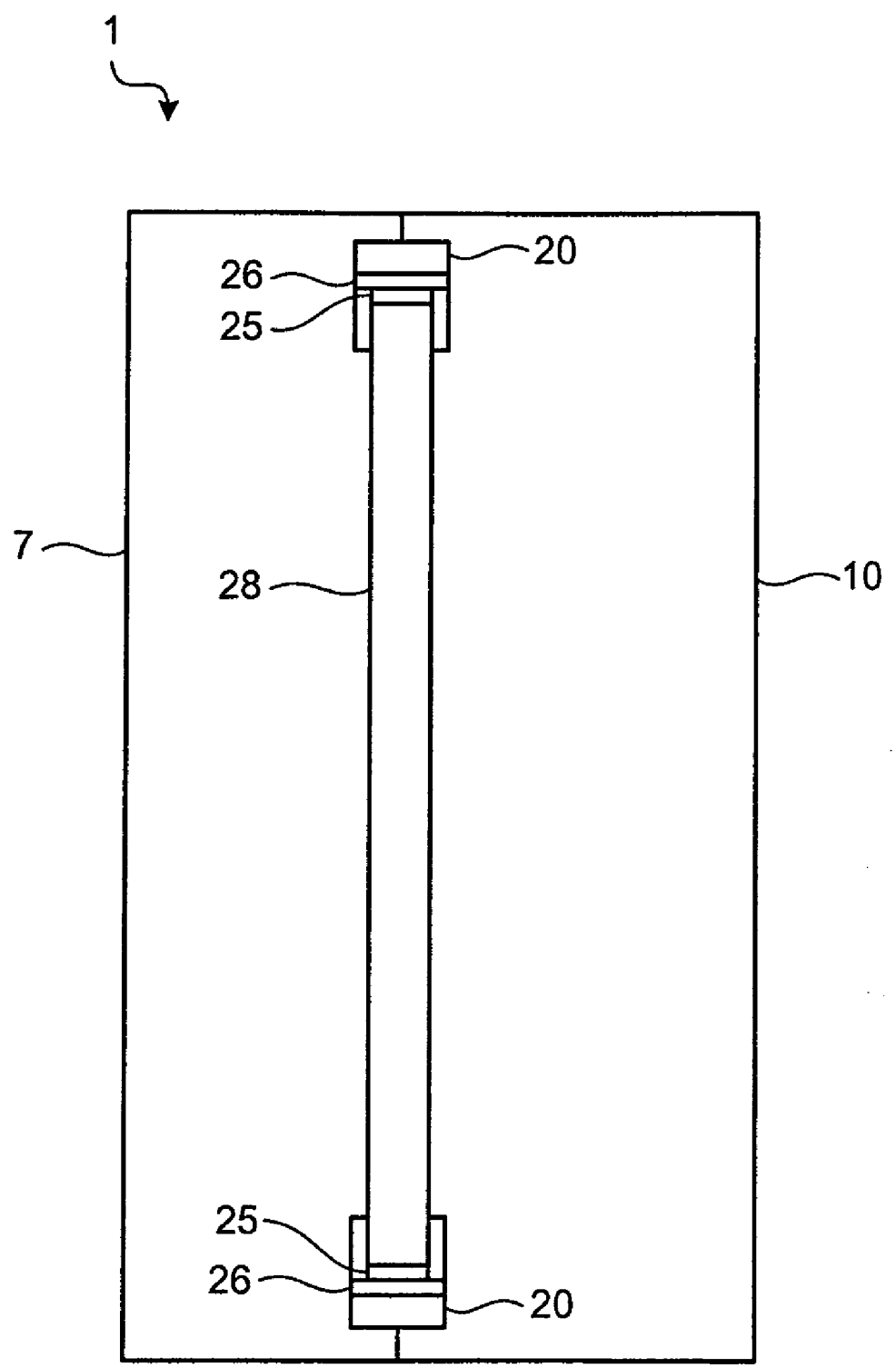
FIG. 3 is a view in the direction of arrows B in FIG. 1.
Figure 4:
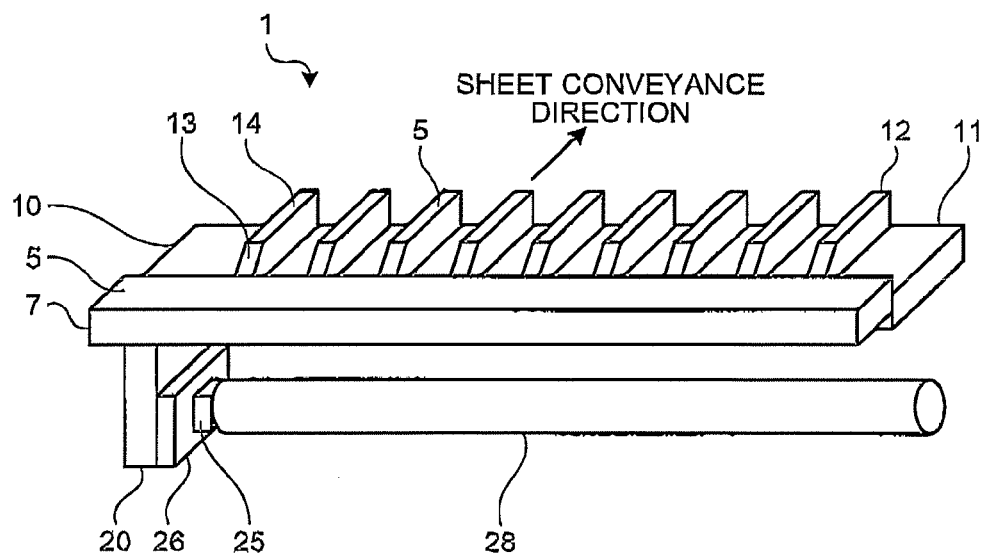
FIG. 4 is a perspective schematic diagram of main components of the image reading apparatus in FIG. 1.
Figure 5:
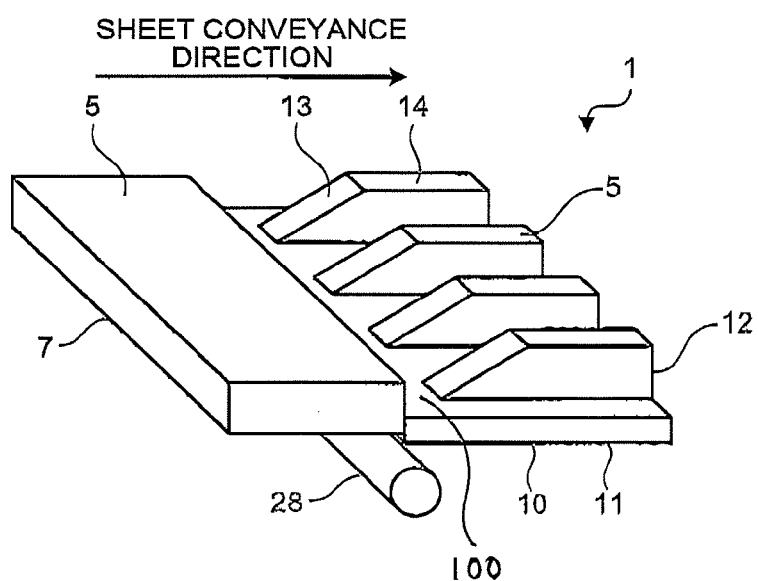
FIG. 5 is a perspective schematic diagram of main components of the image reading apparatus in FIG. 1.

FIG. 1 is a schematic diagram of an image reading apparatus according to a first embodiment of the present invention. FIG. 2 is a view in the direction of arrows A in FIG. 1. FIG. 3 is a view in the direction of arrows B in FIG. 1. FIGS. 4 and 5 are perspective schematic diagrams of main components of the image reading apparatus in FIG. 1. This image reading apparatus 1 illustrated in FIGS. 1 to 5 includes a sheet conveyance path 5 via which a sheet 40 of a document from which an image is to be read by the image reading apparatus 1 is conveyable. The sheet conveyance path 5 is configured to convey the sheet 40 while guiding both sides of the sheet 40 being conveyed. More specifically, the sheet conveyance path 5 includes conveyed-sheet guides 6 that are substantially plate-shaped and formed along the conveyed sheet 40. The conveyed-sheet guides 6 are provided on both sides of the sheet 40 being conveyed through the sheet conveyance path 5.

Near the sheet conveyance path 5, paper feeding rollers 15 capable of conveying the sheet 40 are provided. The paper feeding rollers 15 are substantially cylindrical, and are arranged in a pair, with one of the pair on one side of the sheet 40 being conveyed and the other of the pair on the other side of the sheet 40 being conveyed. The paper feeding rollers 15 are oriented so that a central axis 16 of each cylinder is substantially parallel with the conveyed-sheet guides 6 or with the sheet 40 being conveyed, and is orthogonal to the conveyance direction of the sheet 40. The paper feeding rollers 15 arranged in the pair are each rotatable about the central axis 16 of the cylinder. A plurality of the pair of these paper feeding rollers 15 may be provided near the sheet conveyance path 5 at predetermined interval/intervals in the conveyance direction of the sheet 40.

On the sheet conveyance path 5, a contact glass 7 formed of transparent glass is provided at a position where the sheet 40 of the document is read. The contact glass 7 is made of plate-shaped glass and forms a part of the sheet conveyance path 5. Specifically, the contact glass 7 is arranged so that one surface of the plate forming the contact glass 7 is substantially coplanar with a surface of a part of the conveyed-sheet guides 6 included in the sheet conveyance path 5 and also forming the sheet conveyance path 5.

A liner member 8 is provided at a position on the sheet conveyance path 6 opposite to the contact glass 7. Specifically, the liner member 8 is provided at a position corresponding to the position where the contact glass 7 is positioned in the conveyance direction of the sheet 40 being conveyed on the sheet conveyance path 5, and on one side of the sheet conveyance path 5 guiding both sides of the sheet 40 being conveyed, opposite to the other side on which the contact glass 7 is positioned. The liner member 8 is thus provided opposite to the contact glass 7 constituting a part of the sheet conveyance path 5.

The sheet conveyance path 5 is provided with a heat radiator 10 at a position adjacent to the contact glass 7. The heat radiator 10 is disposed on the same side of the sheet conveyance path 5, which guides both sides of the sheet 40 being conveyed, as the side on which the contact glass 7 is positioned. Further, the heat radiator 10 is disposed downstream of the contact glass 7 in the conveyance direction of the sheet 40 being conveyed on the sheet conveyance path 5.

The heat radiator 10 includes a base 11 that is substantially plate-shaped, and a heat radiator fin 12 that is also substantially plate shaped. The base 11 is oriented so that the plate forming the base 11 is substantially parallel with the sheet conveyance path 5 or with the contact glass 7. The base 11 is positioned more away from the sheet 40 being conveyed on the sheet conveyance path 5 than the contact glass 7, and thus has a difference in level from the contact glass 7.

The heat radiator fin 12 is oriented so that the plate forming the heat radiator fin 12 is orthogonal to the base 11, and extends along the conveyance direction of the sheet 40 being conveyed on the sheet conveyance path 5. The heat radiator 10 includes a plurality of such a heat radiator fin. The plurality of radiator fins 12 are provided on the sheet conveyance path 5 side of the heat radiator 10.

Each heat radiator fin 12 has an inclined portion 13 on an upstream end of the heat radiator fin 12 in the conveyance direction of the sheet 40 being conveyed on the sheet conveyance path 5. The inclined portion 13 is inclined from upstream to downstream in the conveyance direction so as to approach the sheet 40 being conveyed on the sheet conveyance path 5. In other words, an end of the inclined portion 13 on the contact glass 7 side is closest to the base 11, and as distance of a position on the inclined surface of the inclined portion 13 from the contact glass 7 in the conveyance direction of the sheet 40 increases, distance of that position from the base 11 increases. The heat radiator fin 12 is, except for the inclined portion 13 at an end of the heat radiator fin 12 on the sheet conveyance path 5 side, substantially coplanar with the surface of the contact glass 7 on the sheet conveyance path 5 side, thereby forming a flat portion 14 that is substantially in parallel with the conveyance direction of the sheet 40 being conveyed on the sheet conveyance path 5. Thus, the heat radiator fin 12 has its end portion on the contact glass 7 side positioned closer to the base 11 in the heat radiator 10 or positioned more away from the sheet 40 being conveyed on the sheet conveyance path 5 than the surface of the contact glass 7 on the sheet conveyance path 5 side. Further, the flat portion 14 of the heat radiator fin 12 is substantially coplanar with the surface of the contact glass 7 on the sheet conveyance path 5 side.

An end of the heat radiator fin 12 on the contact glass 7 side in the conveyance direction of the sheet 40 being conveyed on the sheet conveyance path 5 is positioned downstream, in the conveyance direction, of the end of the base 11 in the same direction. In other words, the heat radiator fin 12 extends from a position separate from and downstream of the contact glass 7 in the conveyance direction of the sheet 40 to a position corresponding to the downstream end of the base 11 in the conveyance direction. Accordingly, the heat radiator fin 12 of the heat radiator 10 does not adjoin the contact glass 7, and the base 11 has a difference in level from the contact glass 7. Consequently, the end of the heat radiator 10 on the contact glass 7 side has a difference in level from the contact glass 7 in a direction away from the sheet 40 being conveyed on the sheet conveyance path 5. In other words, the contact glass 7 serves as an upstream-of-heat-radiator member, i.e., a member positioned upstream of the heat radiator 10 in the conveyance direction of the sheet 40, and the heat radiator 10 has an upstream end 100 in the conveyance direction of the sheet 40 formed more away from the sheet 40 being conveyed on the sheet conveyance path 5 than the contact glass 7 serving as the upstream-of-heat-radiator member.

The heat radiator 10 is provided on the same side of the sheet conveyance path 5 as that on which the contact glass 7 is positioned, thereby constituting a part of the sheet conveyance path 5. Accordingly, the sheet conveyance path 5 includes the conveyed-sheet guides 6, the contact glass 7, the liner member 8, and the heat radiator 10.

The heat radiator 10 constituting a part of the sheet conveyance path 5 is connected to conductive units 20. The conductive units 20 are made of a material having high thermal conductivity, including one or more of graphite, silver, copper, gold, aluminum, and iron. The conductive units 20 are connected to a surface of the heat radiator 10 that is opposite to the surface of the heat radiator 10 on the sheet conveyance path 5 side. Specifically, the conductive units 20 are connected to a surface of the base 11 of the heat radiator 10 that is opposite to the surface on which the heat radiator fins 12 are provided. The conductive units 20 are connected to a portion near the end of the heat radiator 10 on the contact glass 7 side in the conveyance direction of the sheet 40 being conveyed on the sheet conveyance path 5, and are positioned near the end of the contact glass 7 on the heat radiator 10 side in the conveyance direction of the sheet 40 being conveyed on the sheet conveyance path 5. Two of these conductive units 20 are provided, with one of the conductive units 20 being provided near one of end of the heat radiator 10 in the width direction of the sheet conveyance path 5, i.e., in the direction parallel to the central axes 16 of the paper feeding rollers 15, and the other of the conductive units 20 being provided near the other one of these ends of the heat radiator 10.

The two conductive units 20 are each plate-shaped and bent substantially L-shaped, and connected to the heat radiator 10 with one of the planes of the L-shaped plate being parallel to the base 11 and the other of the planes opposite to the corresponding plane of the other conductive unit 20. The conductive units 20 are thus connected to the heat radiator 10 with their planes facing opposite to each other projecting from the heat radiator 10 in the direction away from the sheet conveyance path 5.

Between the two conductive units 20 connected to the heat radiator 10, light emitting diodes (LEDs) 25 serving as light sources and a light guide tube 28 are provided. The number of the LEDs 25 provided is two, like the conductive units 20. The two LEDs 25 are each connected to a different one of the conductive units 20. Specifically, the LEDs 25 are connected to boards 26 configured to control electricity supplied to the LEDs 25. These boards 26 are connected to the conductive units 20 so as to connect the LEDs 25 to the conductive units 20. Specifically, the boards 26 are connected to the oppositely facing planes of the conductive units 20, so that the two LEDs 25 each connected to the different one of the conductive unit 20 are also oriented opposite to each other. The LEDs 25 connected to the boards 26 each include a heat radiating portion (not illustrated) connected to the corresponding board 26.

The light guide tube 28 is tube-shaped with one end of the light guide tube 28 arranged close to or in contact with one of the two LEDs 25, and the other end close to or in contact with the other one of the two LED 25. In other words, the light guide tube 28 is provided between the LEDs 25 facing each other.

On one side of the contact glass 7 opposite to the sheet conveyance path 5 side, a reflective member 30 is provided. The reflective member 30 is plate-shaped having a substantially equal width in the width direction of the sheet conveyance path 5 to the width of the contact glass 7 in the same direction. The reflective member 30 is arranged inclined in the direction away from the contact glass 7, namely, in the direction away from the sheet conveyance path 5, from the upstream to the downstream in the conveyance direction of the sheet 40 being conveyed on the sheet conveyance path 5. Therefore, the surface of the reflective member 30 on the contact glass 7 side faces the contact glass 7 and also faces the light guide tube 28 connected to the conductive units 20 connected to the heat radiator 10. The surface of the reflective member 30 facing the contact glass 7 and the light guide tube 28 is mirror-finished.

On one side of the contact glass 7 opposite to the sheet conveyance path 5 side, a reading unit 35 is provided. The reading unit 35 is at a position opposite to the sheet conveyance path 5 with respect to the contact glass 7, and in the vicinity of a position corresponding to the center of the contact glass 7 in the width direction of the sheet conveyance path 5. The reading unit 35 thus arranged includes an image reading device (not illustrated) such as a charge connected device (CCD) camera. The image reading device is arranged in the reading unit 35 so as to face the contact glass 7.

The image reading apparatus 1 according to the first embodiment is configured as described above, and the operation thereof will now be described. To read an image from the sheet 40 of the document with the image reading apparatus 1 according to the first embodiment, at least one of the pair of paper feeding rollers 15 is driven to rotate to convey the sheet 40 to the position corresponding to the contact glass 7. The paper feeding roller 15 is rotated such that the surface of the paper feeding roller 15 on the sheet conveyance path 5 side heads for the conveyance direction of the sheet 40.

To convey the sheet 40 to the position corresponding to the contact glass 7, the paper feeding roller 15 is driven to rotate in this manner, and a paper feeding device (not shown) positioned upstream of the paper feeding rollers 15 feeds the sheet 40 to the paper feeding rollers 15 such that the sheet 40 passes between the pair of paper feeding rollers 15 positioned upstream of the contact glass 7 in the conveyance direction of the sheet 40. The sheet 40 is thus moved by frictional force between the sheet 40 and the rotating paper feeding rollers 15. Accordingly, the sheet 40 is conveyed on the sheet conveyance path 5 while being guided by the conveyed-sheet guides 6 and other members that constitute the sheet conveyance path 5. The sheet 40 being guided and conveyed on the sheet conveyance path 5 reaches the position corresponding to the contact glass 7 constituting a part of the sheet conveyance path 5.

To read the image from the sheet 40, light is emitted by both of the two LEDs 25. The light emitted by the LEDs 25 enters and travels through the light guide tube 28 while being reflected in the light guide tube 28 with a part of the light transmitted outside the light guide tube 28. The light that has entered the light guide tube 28 thus travels through while being reflected in the light guide tube 28, with a part of the light being transmitted outside the light guide tube 28. Therefore, the light that has been emitted from the LEDs 25 and has entered the light guide tube 28 is irradiated outward from the entire light guide tube 28. In other words, when light is emitted by the LEDs 25, light is emitted from the entire light guide tube 28.

When light is emitted from the light guide tube 28 by the emission of light from the LEDs 25, a part of the light from the light guide tube 28 heads in the direction toward the contact glass 7. Because the contact glass 7 is made of transparent glass, the light that has reached the contact glass 7 transmits through the contact glass 7. Consequently, when the sheet 40 being conveyed on the sheet conveyance path 5 reaches the position corresponding to the contact glass 7, the sheet 40 is irradiated with the light that has transmitted through the contact glass 7.

Another part of the light emitted from the light guide tube 28 heads in the direction toward the reflective member 30. The surface of the reflective member 30 facing the light guide tube 28 is mirror-finished, and the surface also faces the contact glass 7. Therefore, the light that has reached the reflective member 30 is reflected on the mirror-finished surface of the reflective member 30 in the direction toward the contact glass 7. The light thus goes in the direction toward the contact glass 7. In this manner, the light that has been reflected on the reflective member 30 and headed for the contact glass 7 transmits through the contact glass 7, like the light traveling in the direction toward the contact glass 7 directly from the light guide tube 28, to irradiate the sheet 40 that has reached the position corresponding to the contact glass 7.

The sheet 40 conveyed on the sheet conveyance path 5 to reach the position corresponding to the contact glass 7 is thus irradiated with the light from the light guide tube 28 transmitting through the contact glass 7. On the side of the contact glass 7 opposite to the sheet conveyance path 5 side, the reading unit 35 including the image reading device is provided. The light irradiating the sheet 40 is reflected by the sheet 40, and a part of the reflected light travels in the direction toward the reading unit 35. The reading unit 35 receives the light with the image reading device, to read the image from the sheet 40.

To read the image from the sheet 40 with the image reading apparatus 1, the sheet 40 is conveyed on the sheet conveyance path 5 by rotating the paper feeding rollers 15, and when the sheet 40 passes the position corresponding to the contact glass 7, the reading unit 35 continuously reads the image on the sheet 40 using the light emitted from the LEDs 25. In addition, because the liner member 8 is provided at the position opposite to the contact glass 7 in the sheet conveyance path 5, the sheet 40 passes the position corresponding to the contact glass 7 flatly, without being bent or rippled between the contact glass 7 and the liner member 8. The sheet 40 thus remains flat while the reading unit 35 is reading the image from the sheet 40, so that the reading unit 35 is able to clearly read the image from the sheet 40.

The sheet 40 that has passed the position corresponding to the contact glass 7 reaches a position corresponding to the heat radiator 10 disposed downstream of the contact glass 7 in the conveyance direction of the sheet 40. Because the end of the heat radiator 10 on the contact glass 7 side has a difference in level from the contact glass 7 in the direction away from the sheet 40 being conveyed on the sheet conveyance path 5, the sheet 40 that has reached the position corresponding to the heat radiator 10 does not come into contact with the heat radiator 10 in the conveyance direction. In other words, because the heat radiator 10 is formed such that its end on the contact glass 7 side is more away from the sheet 40 being conveyed on the sheet conveyance path 5 than the contact glass 7, the sheet 40 that has just reached from the contact glass 7 side the position corresponding to the heat radiator 10 does not come into contact with the heat radiator 10.

The heat radiator 10 includes the heat radiator fins 12 on the sheet conveyance path 5 side, and each of the heat radiator fins 12 has the inclined portion 13 at the end of the radiator fin 12 on the contact glass 7 side. Therefore, the sheet 40 being conveyed to reach and come into contact with the heat radiator fins 12 moves along the slope of the inclined portion 13. The sheet 40 that has moved along the slope of the inclined portion 13 then reaches a position corresponding to the flat portions 14 positioned downstream of the inclined portions 13 in the conveyance direction of the sheet 40, and moves along the flat portions 14 while being in contact with the flat portions 14. Therefore, the sheet 40 being conveyed to reach the position corresponding to the heat radiator 10 passes the portion corresponding to the heat radiator 10 without being jammed at the heat radiator 10. The sheet 40 being conveyed on the sheet conveyance path 5 past the heat radiator 10 is conveyed further in the downstream direction.

To read the image from the sheet 40 with the image reading apparatus 1, as described above, light is emitted by the LEDs 25, resulting in heat being generated by the LEDs 25. The heat generated by the LEDs 25 upon the emission of light from the LEDs 25 is transferred to the boards 26 connected to the LEDs 25, and then to the conductive units 20 connected to the boards 26. Because the conductive units 20 are connected to the LEDs 25 via the boards 26, the heat generated at the LEDs 25 is transferred to the conductive units 20 via the boards 26 from the LEDs 25. In other words, the conductive units 20 are configured such that the heat generated at the LEDs 25 is transferable to the conductive units 20 from the LEDs 25.

The conductive units 20 made of the material having high thermal conductivity are configured to propagate the heat transferred from the LEDs 25. The conductive units 20 propagate the heat to the heat radiator 10 connected to the conductive units 20. Because the heat radiator 10 is connected to the conductive units 20, the heat transferred to the conductive units 20 from the LEDs 25 is propagated from the conductive units 20 to the heat radiator 10. When the heat generated upon light emission by the LEDs 25 is propagated to the heat radiator 10 via the conductive units 20, the heat radiator 10 radiates the heat to the surroundings.

The heat radiator 10 constitutes a part of the sheet conveyance path 5, and one surface of the heat radiator 10 opposite to the other surface on which the conductive units 20 are connected serves as a surface along which the sheet 40 being conveyed passes. While the sheet 40 is being conveyed, the air surrounding the sheet 40 also moves along with the movement of the sheet 40. Consequently, when the sheet 40 is conveyed on the sheet conveyance path 5, the air flows in the sheet conveyance path 5. The heat radiator 10 is thus exposed to the air flowing in the sheet conveyance path 5 when the sheet 40 is conveyed. Thus the air around the heat radiator 10 on the sheet conveyance path 5 side is not stagnant. This facilitates the heat radiator 10 to radiate heat from the sheet conveyance path 5 side from among heat to be radiated to the surroundings. In other words, because the air flowing in the sheet conveyance path 5 facilitates the heat radiator 10 to radiate heat from the sheet conveyance path 5 side, the heat propagated from the conductive units 20 is radiated to the air flowing in the sheet conveyance path 5 upon the conveyance of the sheet 40.

The heat radiator fins 12 are provided on the heat radiator 10 on the sheet conveyance path 5 side to increase the surface area of the heat radiator 10 on the sheet conveyance path 5 side. In addition, because the heat radiator fins 12 are formed along the conveyance direction of the sheet 40, the air flowing in the sheet conveyance path 5 while the sheet 40 is conveyed passes between the plurality of heat radiator fins 12 and flows from the upstream to the downstream in the conveyance direction of the sheet 40 without being blocked by the heat radiator fins 12. As a result, the heat radiator 10 is able to more easily radiate the heat propagated from the conductive units 20 to the air flowing in the sheet conveyance path 5 via the heat radiator fins 12. When the LEDs 25 emit light, the heat radiator 10 radiates the heat to the air flowing in the sheet conveyance path 5 as described, thereby suppressing an excessive increase in the temperature of the LEDs 25.

The sheet 40 being conveyed to reach a position corresponding to the heat radiator fins 12 moves along the flat portions 14 of the heat radiator fins 12 while contacting the flat portions 14. The heat in the radiator fins 12 is thus transferred to the sheet 40. In this manner, the heat upon the light emission by the LEDs 25 transferred to heat the radiator fins 12 from the conductive units 20 is transferred to the sheet 40. As a result, the heat propagation to the heat radiator fins 12 via the conductive units 20 from the LEDs 25 is facilitated, thereby suppressing an excessive increase in the temperature of the LEDs 25.

In the image reading apparatus 1, the conductive units 20 propagate heat generated at the LEDs 25 to the heat radiator 10, and the heat radiator 10 radiates the heat to the air flowing in the sheet conveyance path 5 while the sheet 40 is conveyed. Specifically, while the sheet 40 is being conveyed on the sheet conveyance path 5 in one direction, the air around the sheet 40 also flows along with the conveyance of the sheet 40 on the sheet conveyance path 5. Because the heat radiator 10 radiates the heat generated at the LEDs 25 to the air flowing in the sheet conveyance path 5, even if the heat is radiated to the surrounding air from the heat radiator 10, the air flows along with the conveyance of the sheet 10, and thus it is possible to suppress an increase in the temperature surrounding the heat radiator 10. Therefore, it becomes easy for the heat radiator 10 to radiate the heat to the surrounding air and thus to radiate the heat from the LEDs 25 propagated to the heat radiator 10 via the conductive units 20. Accordingly, the heat generated at the LEDs 25 is efficiently radiated. Furthermore, providing the conductive units 20 and the heat radiator 10 enables the efficient radiation of the heat generated at the LEDs 25 with such a simple configuration without having to additionally provide any special radiator fans or other devices. As a result, more efficient heat radiation can be achieved by a simple configuration.

Moreover, such efficient radiation of the heat generated at the LEDs 25 maintains the temperature of the LEDs 25 equal to or less than a desired level, thereby extending the life of the LEDs 25. Consequently, it is possible to obtain a high-quality image reading apparatus that hardly breaks down. In addition, because efficient heat radiation is achieved by this simple configuration, it is possible to further downsize the image reading apparatus even if the apparatus is to be provided with means for radiating the heat generated at the LEDs 25.

The heat radiating portions of the LEDs 25 are connected to the boards 26. Accordingly, the heat generated upon light emission by the LEDs 25 is transferred to the boards 26 from the heat radiating portions, and then to the conductive units 20 from the boards 26 more reliably. The heat generated upon the light emission by the LEDs 25 is thus propagated to the heat radiator 10, and then radiated by the heat radiator 10 more reliably. Consequently, the heat is more efficiently radiated.

Furthermore, because the heat radiator 10 includes the heat radiator fins 12 on the sheet conveyance path 5 side, the surface area of the heat radiator 10 on the sheet conveyance path 5 side increases, and thus the area of the heat radiator 10 that contacts the air flowing in the sheet conveyance path 5 increases. Therefore, the heat generated at the LEDs 25 and propagated to the heat radiator 10 is more easily radiated through the heat radiator fins 12 to the air flowing in the sheet conveyance path 5, thereby facilitating the heat radiator 10 to radiate the heat. Consequently, more efficient heat radiation is achieved.

Because the heat radiator 10 includes the heat radiator fins 12, the heat radiator fins 12 come into contact with the sheets 40 conveyed sequentially. The heat radiator 10 thus transfers the heat from the LEDs 25 propagated by the conductive units 20 to the sheets 40, thereby facilitating propagation of the heat transferred to the conductive units 20 from the LEDs 25, to the heat radiator 10 from the conductive units 20. Consequently, more efficient heat radiation is achieved.

Each of the heat radiator fins 12 has the inclined portion 13 at the upstream end of the heat radiator fin 12 in the conveyance direction of the sheet 40. Therefore, the sheet 40 being conveyed to reach the position corresponding to the radiator fins 12 first reaches the inclined portions 13 of the radiator fins 12. Each inclined portion 13 is inclined from the upstream to the downstream in the conveyance direction of the sheet 40 to approach the sheet 40 being conveyed on the sheet conveyance path 5. Therefore, even if the sheet 40 that has reached the position corresponding to the radiator fins 12 comes into contact with the radiator fins 12, the sheet 40 is conveyed with the leading end of the sheet 40 in the conveyance direction moving along the slope of the inclined portions 13. This prevents the sheet 40 from being jammed at the radiator fins 12 even if the heat radiator fins 12 are provided. Consequently, more efficient heat radiation is achieved while jamming of the sheet 40 is suppressed.

The heat radiator 10 has its upstream end in the conveyance direction of the sheet 40 formed in a shape further away from the sheet 40 being conveyed on the sheet conveyance path 5 than the contact glass 7 serving as the upstream-of-heat-radiator member. Therefore, while the sheet 40 being conveyed on the sheet conveyance path 5 is conveyed to the heat radiator 10 side from the contact glass 7 side, the sheet 40 being conveyed is prevented from coming into contact with the upstream end of the heat radiator 10 in the conveyance direction and from being jammed. Consequently, more efficient heat radiation is achieved while jamming of the sheet 40 is suppressed.

Because the heat radiator 10 includes the heat radiator fins 12, the sheet 40 being conveyed to reach the portion corresponding to the heat radiator 10 is conveyed along the flat portions 14 of the heat radiator fins 12. Therefore, friction between the sheet 40 and the heat radiator 10 is reduced, thereby facilitating the conveyance of the sheet 40. Consequently, the sheet 40 is conveyed smoothly.

Second Embodiment

Figure 6:
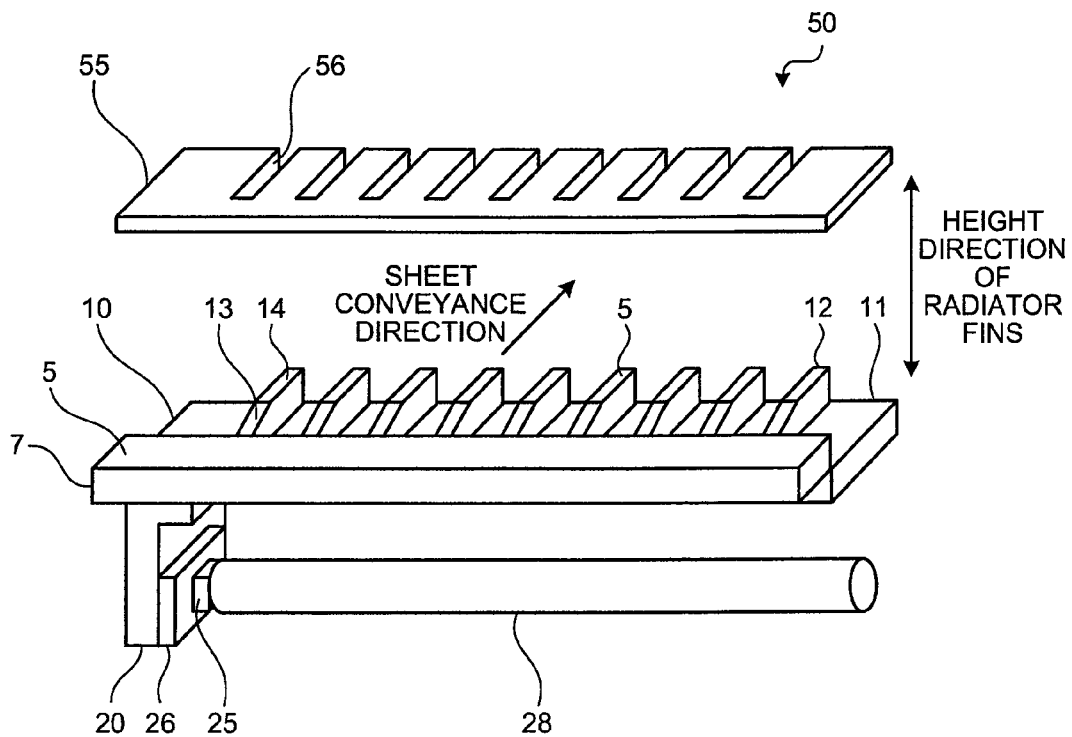
FIG. 6 is a schematic diagram of an image reading apparatus according to a second embodiment of the present invention before a shielding plate is mounted thereon.

An image reading apparatus 50 according to a second embodiment of the present invention is configured substantially similarly to the image reading apparatus 1 of the first embodiment, and further includes a shielding plate 55 to shield the heat radiator 10. Other components are similar to those in the first embodiment, and therefore, they will be denoted by the same reference numerals and the description thereof will be omitted. FIG. 6 is a schematic diagram of the image reading apparatus 50 according to the second embodiment before the shielding plate 55 is mounted. The image reading apparatus 50 according to the second embodiment includes the shielding plate 55 that is a shielding member disposed on the heat radiator 10 on the sheet conveyance path 5 side. The shielding plate 55 is substantially plate-shaped like the base 11 of the heat radiator 10, and the thickness of the shielding plate 55 is less than the height of the heat radiator fins 12. Furthermore, the shielding plate 55 includes at its downstream end in the conveyance direction of the sheet 40 (see FIG. 1) notches 56 that are cut out to pass the heat radiator fins 12 of the heat radiator 10 through the notches 56. The notches 56 are formed approximate to and larger than the projected shape of the heat radiator fins 12 viewed in the direction in which the heat radiator fins 12 project relative to the base 11, namely, in the height direction of the heat radiator fins 12. In other words, the notches 56 are configured such that the heat radiator fins 12 are able to pass through the notches 56.

The number of the notches 56 is the same as the number of the heat radiator fins 12 of the heat radiator 10. The notches 56 are formed at the same interval/intervals as those of the heat radiator fins 12. In other words, the notches 56 are formed slightly larger than the projected shape of the radiator fins 12, and are positioned relatively to each other similarly to the relative positions between the heat radiator fins 12.

Figure 7:
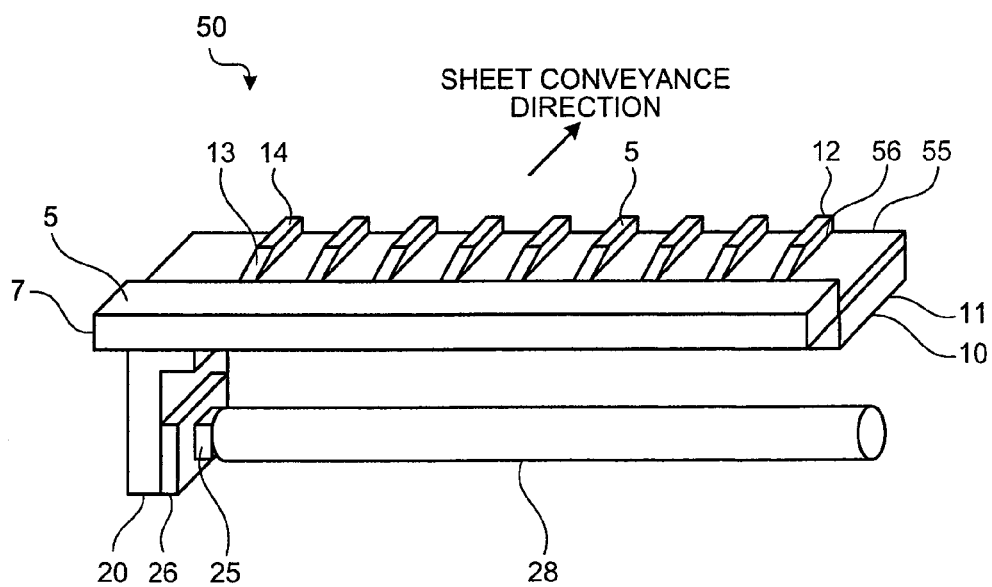
FIG. 7 is a schematic diagram of the image reading apparatus in FIG. 6 with the shielding plate mounted thereon.

FIG. 7 is a schematic diagram of the image reading apparatus 50 of FIG. 6 with the shielding plate 55 mounted thereon. The shielding plate 55 formed with the notches 56 is disposed on the heat radiator 10 on the sheet conveyance path 5 side. When the shielding plate 55 is disposed, the heat radiator fins 12 provided on the heat radiator 10 on the sheet conveyance path 5 side are passed through the notches 56 of the shielding plate 55. The plate thickness of the shielding plate 55 is less than the height of the heat radiator fins 12.

Therefore, the shielding plate 55 is disposed on the heat radiator 10 on the sheet conveyance path 5 side such that the heat radiator fins 12 pass through the notches 56 and project from the shielding plate 55 toward the sheet conveyance path 5. In other words, in the sheet conveyance path 5, the shielding plate 55 is disposed on the side of the sheet conveyance path 5 where the heat radiator 10 is positioned, with the heat radiator fins 12 passing through the notches 56. Like the base 11 of the heat radiator 10, the shielding plate 55 thus disposed on the heat radiator 10 on the sheet conveyance path 5 side is positioned further away from the sheet 40 being conveyed on the sheet conveyance path 5 than the contact glass 7, and thus has a difference in level from the contact glass 7.

The image reading apparatus 50 according to the second embodiment is configured as described above and the operation thereof will now be described. To read an image from a sheet with the image reading apparatus 50, the paper feeding rollers 15 (see FIG. 1) are driven to rotate, whereby the sheet 40 is conveyed on the sheet conveyance path 5. The sheet 40 is conveyed on the sheet conveyance path 5 and thus passes a portion corresponding to the contact glass 7. The reading unit 35 (see FIG. 1) reads the image from the sheet 40 with the light emitted from the LEDs 25 (see FIG. 1).

The sheet 40 conveyed on the sheet conveyance path 5 past the portion corresponding to the contact glass 7 then reaches a portion corresponding to the heat radiator 10. At the portion corresponding to the heat radiator 10, the shielding plate 55 is disposed on the heat radiator 10 on the sheet conveyance path 5 side. Thus, the portion corresponding to the heat radiator 10 in the sheet conveyance path 5 is flatter than that in the configuration without the shielding plate 55. As a result, the sheet 40 conveyed to reach the portion corresponding to the heat radiator 10 is even less likely to be jammed at the heat radiator 10, facilitating the conveyance of the sheet 40.

The shielding plate 55 is formed with the notches 56 and the heat radiator fins 12 of the heat radiator 10 pass through the notches 56 and project through the notches 56 toward the sheet conveyance path 5. Accordingly, the sheet 40 that has reached the portion corresponding to the heat radiator 10 comes into contact with the heat radiator fins 12 and is conveyed along the flat portions 14 of the heat radiator fins 12. The heat from the LEDs 25 upon emission of light from the LEDs 25 and propagated to the heat radiator 10 from the conductive units 20 is transferred to the sheet 40.

While the sheet 40 is being conveyed, the air surrounding the sheet 40 also flows along with the movement of the sheet 40, resulting in the air to flow in the sheet conveyance path 5. The heat radiator fins 12 of the heat radiator 10 project from the shielding plate 55. Accordingly, the heat radiator fins 12 of the heat radiator 10 radiate the heat from the LEDs 25 propagated to the heat radiator 10 via the conductive units 20 to the air flowing in the sheet conveyance path 5.

The image reading apparatus 50 includes the shielding plate 55 formed with the notches 56 in the sheet conveyance path 5. The sheet conveyance path 5 is thus made as flat as possible, thereby reducing jamming of the sheet 40. Furthermore, providing the shielding plate 55 makes components around the sheet conveyance path 5 invisible from the outside when the sheet conveyance path 5 is visually inspected for maintenance, for example, thereby improving the appearance. In addition, because the shielding plate 55 is disposed with the heat radiator fins 12 passing through the notches 56, heat radiation performance of the heat radiator 10 is ensured even if the shielding plate 55 is provided. Accordingly, while achieving efficient heat radiation, jamming of the sheet 40 being conveyed is suppressed and the appearance is improved.

Figure 8:
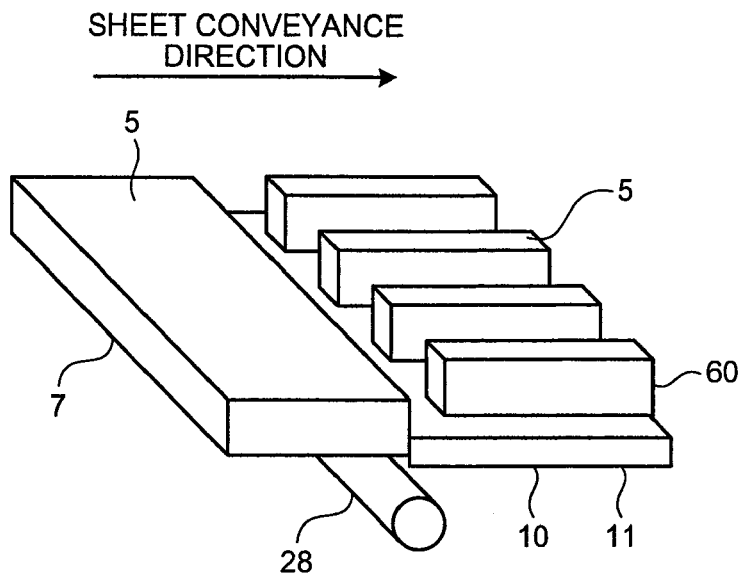
FIG. 8 is a perspective view of main components of a modification of the image reading apparatus according to the first embodiment.

FIG. 8 is a perspective view of main components of a modified example of the image reading apparatus according to the first embodiment. While each heat radiator fin 12 of the heat radiator 10 is formed with the inclined portion 13 (see FIG. 5) in the image reading apparatus 1 according to the first embodiment, heat radiator fins 60 may be formed without any inclined portions 13 as illustrated in FIG. 8. If the sheet 40 being conveyed on the sheet conveyance path 5 (see FIG. 1) is unlikely to be jammed at the heat radiator fins 60 depending on the conveyance speed of the paper 40, relative positions of the contact glass 7 and the heat radiator fins 60, or the like, even if the radiator fins 60 have no inclined portions 13, the paper 40 may be conveyed without being jammed at the radiator fins 60. Accordingly, the manufacturing process is further simplified because the inclined portions 13 are not formed, and efficient heat radiation is performed with a simpler configuration.

Figure 9:
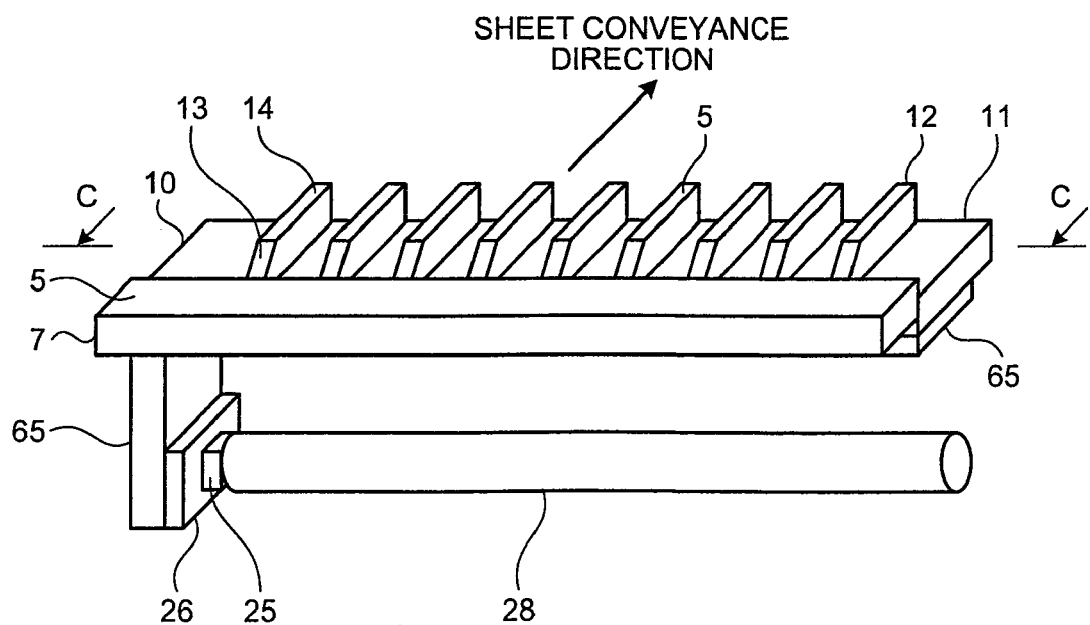
FIG. 9 is a perspective view of main components of another modification of the image reading apparatus according to the first embodiment.
Figure 10:
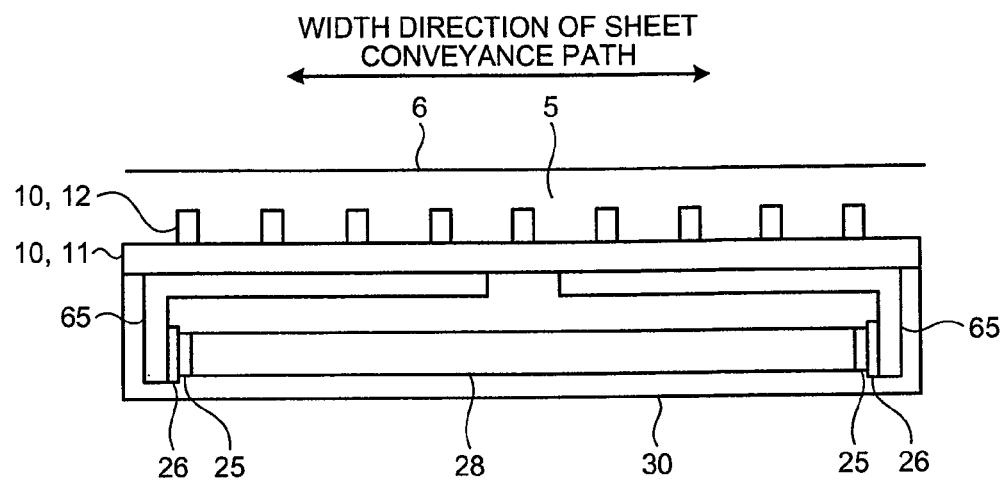
FIG. 10 is a view in the direction of arrows C in FIG. 9.

FIG. 9 is a perspective view of main components of a modified example of the image reading apparatus according to the first embodiment. FIG. 10 is a view in the direction of arrows C in FIG. 9. While the conductive units 20 are made of a material having high thermal conductivity in the image reading apparatus 1 according to the first embodiment, the conductive units 20 may be physically structured so as to have high heat transfer efficiency. As illustrated in FIGS. 9 and 10, for example, conductive units 65 may be made of known heat pipes. In other words, the conductive units 65 may each be pipe-shaped, made of a material having high thermal conductivity, and filled with a working fluid with high volatility sealed inside the pipes. The conductive units 65 made of such heat pipes are able to propagate the heat generated by the LEDs 25 to the sheet conveyance path 5 even more reliably. More specifically, by making the conductive units 65 with the heat pipes having high thermal conductivity, to propagate the heat generated at the LEDs 25 to the sheet conveyance path 5 through the heat pipes, the heat is propagated to the sheet conveyance path 5 more efficiently. Consequently, more efficient heat radiation is achieved.

If the conductive units 65 are made of these heat pipes, one end of each conductive unit 65 connected to the corresponding LED 25 via the corresponding board 26 is preferably positioned below the other end of the conductive unit 65 connected to the heat radiator 10. This configuration facilitates the working fluid in the conductive units 65 vaporized by absorbing the heat from the LEDs 25 and liquefied by releasing the heat at the heat radiator 10 to return to the ends of the conductive units 65 connected to the LEDs 25. Accordingly, it is possible for the conductive units 65 to function as the heat pipes more reliably, thereby achieving efficient heat radiation.

Figure 11:
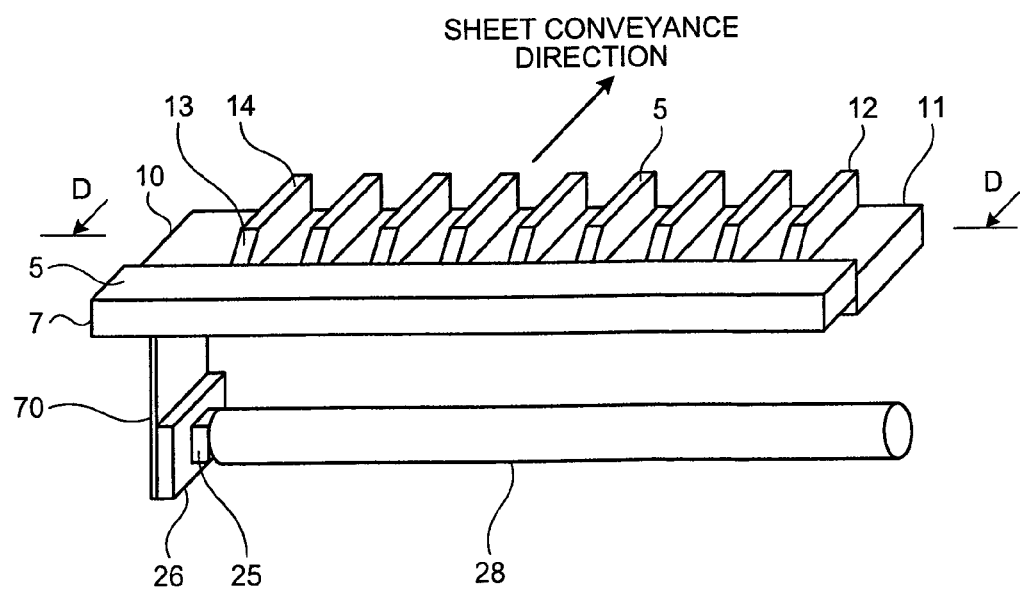
FIG. 11 is a perspective view of main components of still another modification of the image reading apparatus according to the first embodiment.
Figure 12:
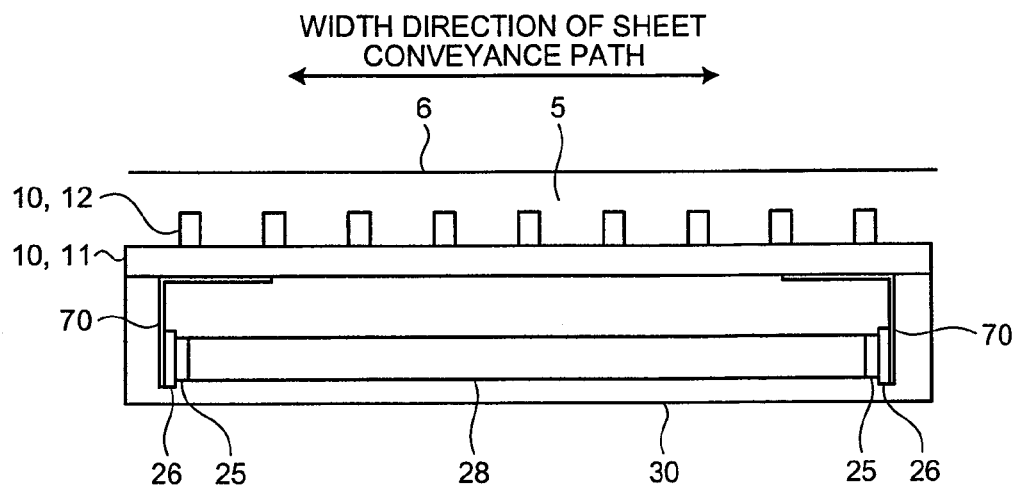
FIG. 12 is a view in the direction of arrows D in FIG. 11.

FIG. 11 is a perspective view of main components of yet another modified example of the image reading apparatus according to the first embodiment. FIG. 12 is a view in the direction of arrows D in FIG. 11. The conductive units 20 are made of a material having high thermal conductivity in the image reading apparatus 1 according to the first embodiment. The thickness of the conductive units 20 may be reduced if they are made of a material having very high thermal conductivity. As illustrated in FIGS. 11 and 12, for example, the thickness of conductive units 70 may be reduced when they are made of such a material having very high thermal conductivity like a graphite sheet. The conductive units 70 are preferably configured to propagate the heat generated at the LEDs 25 to the heat radiator 10 efficiently. Therefore, the thickness of the conductive units 70 may be reduced as long as their heat propagation performance is high enough to propagate the heat generated at the LEDs 25 to the heat radiator 10 without allowing the temperature of the LEDs 25 to rise excessively. By reducing the thickness of the conductive units 70 made of a material having very high thermal conductivity, it is possible to reduce the weight of the conductive units 70 while ensuring their heat propagation performance. Consequently, more efficient heat radiation is achieved while being able to reduce the weight of the image reading apparatus.

Figure 13:
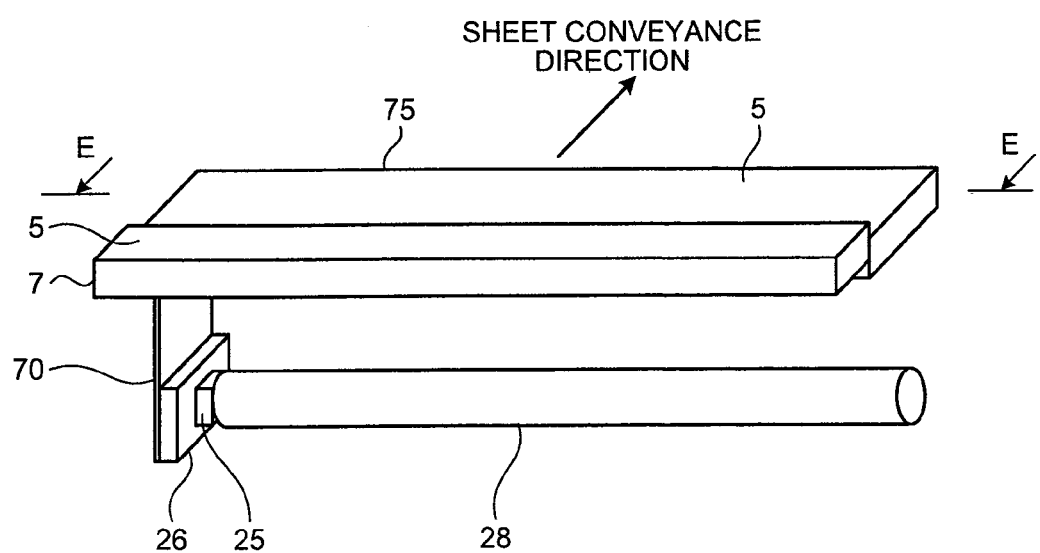
FIG. 13 is a perspective view of main components of yet another modification of the image reading apparatus according to the first embodiment.
Figure 14:
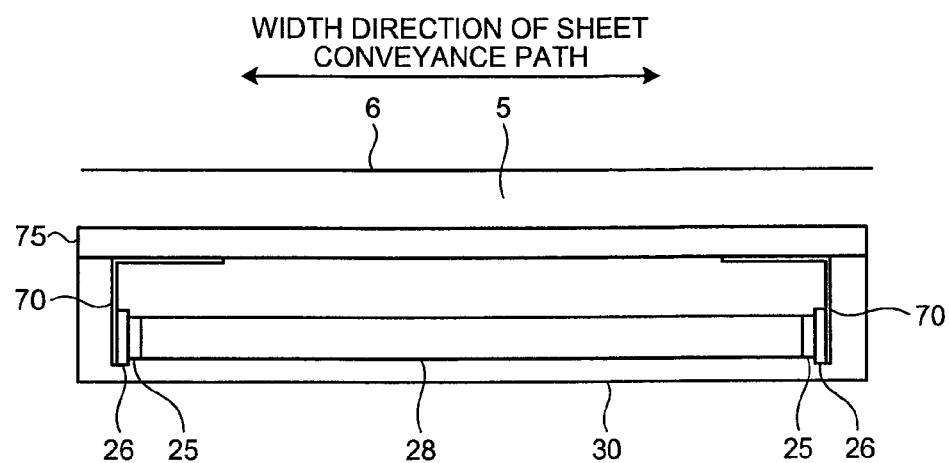
FIG. 14 is a view in the direction of arrows E in FIG. 13.

FIG. 13 is a perspective view of main components of still another modified example of the image reading apparatus according to the first embodiment. FIG. 14 is a view in the direction of arrows E in FIG. 13. As illustrated in FIGS. 13 and 14, a radiator 75 may be formed without any heat radiator fins 12 (see FIG. 4), as long as the heat radiation at the heat radiator is efficiently performed. If the radiator 75 is made of a material with high heat radiation performance or the amount of heat generated at the LEDs 25 is small, the heat radiator 75 is capable of radiating the heat generated at the LEDs 25 without its heat radiation performance being enhanced by the provision of the heat radiator fins 12 to the heat radiator 75. If the heat radiator 75 is capable of performing efficient heat radiation without the heat radiator fins 12, manufacturing of the heat radiator 75 becomes simpler by omitting the heat radiator fins 12. Furthermore, the whole weight is reduced without the heat radiator fins 12. If the radiator 75 is to be omitted altogether to reduce the weight, the conductive units 70 may be made of a material having very high thermal conductivity such as the graphite sheet as mentioned above, to reduce the thickness of the conductive units 70. Consequently, efficient heat radiation is achieved, while the weight of the image reading apparatus is reduced with a simpler configuration.

Figure 15:
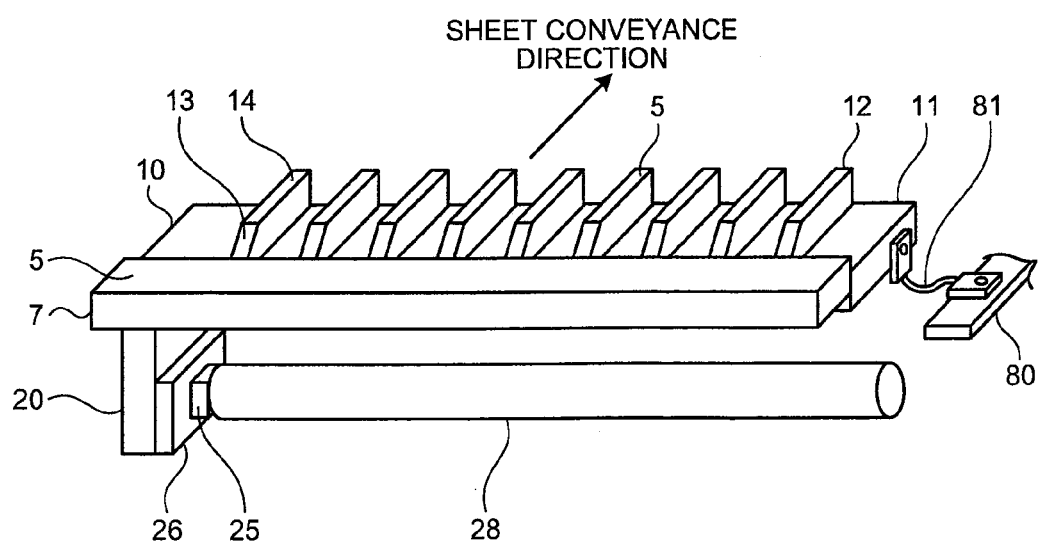
FIG. 15 is a perspective view of main components of still another modification of the image reading apparatus according to the first embodiment.

FIG. 15 is a perspective view of main components of a modified example of an image reading apparatus according to the first embodiment. The heat radiator 10 may be grounded. More specifically, the heat radiator 10 may be connected to a member serving as a reference potential point, such as a metal frame 80, through a ground code 81 to be grounded as depicted in FIG. 15. By grounding the heat radiator 10, it is possible to prevent the heat radiator 10 from being charged electrically and suppress jamming of the sheet 40 (see FIG. 1) caused by charging of the heat radiator 10. Because the heat radiator 10 constitutes a part of the sheet conveyance path 5, if the heat radiator 10 is charged electrically, the sheet 40 being conveyed on the sheet conveyance path 5 may be attracted by the heat radiator 10 due to the static electricity. This makes the conveyance of the sheet 40 difficult, and may result in jamming. In view of this, the heat radiator 10 is grounded to prevent it from being charged electrically, thereby preventing the sheet 40 conveyed on the sheet conveyance path 5 from being attracted by the heat radiator 10 due to its static electricity, and thus suppressing jamming of the sheet 40. Accordingly, jamming of the sheet 40 being conveyed is suppressed while efficient heat radiation is achieved.

The shielding plate 55 of the image reading apparatus 50 according to the second embodiment is formed with the notches 56, the shielding plate 55 is disposed on the heat radiator 10 on the sheet conveyance path 5 side, and the heat radiator fins 12 of the heat radiator 10 are arranged to pass through the notches 56 of the shielding plate 55. These notches 56 formed in the shielding plate 55 so as to pass the heat radiator fins 12 through the notches 56 may be replaced with holes penetrating through the shielding plate 55. In this case, the holes are formed, like the notches 56, approximate to and larger than the projected shape of the heat radiator fins 12 viewed in the height direction of the heat radiator fins 12. Therefore, when the shielding plate 55 is provided on the heat radiator 10 on the sheet conveyance path 5 side, the heat radiator fins 12 are allowed to pass through the holes.

Accordingly, by providing the sheet conveyance path 5 with the shielding plate 55 formed with at least one of the holes and the notches 56, the sheet conveyance path 5 becomes as flat as possible, thereby reducing jamming of the sheet 40 being conveyed and improving the appearance around the sheet conveyance path 5. In addition, because the shielding plate 55 is disposed with the heat radiator fins 12 passing through the holes or the notches 56, heat radiation performance of the heat radiator 10 is ensured even if the shielding plate 55 is added. Accordingly, while achieving efficient heat radiation, jamming of the sheet 40 being conveyed is suppressed and the appearance is improved.

The boards 26 of the LEDs 25 connected to the conductive units 20, 65, and 70 are preferably made of a material having high thermal conductivity like the materials of the conductive units 20, 65, and 70. The heat generated at the LEDs 25 is first transferred to the boards 26 and then to the conductive units 20, 65, or 70 via the boards 26. Therefore, by forming the boards 26 with a material having high thermal conductivity, the heat transferred from the LEDs 25 is more reliably transferred to the conductive units 20, 65, or 70. The heat that has been transferred to the conductive units 20, 65, or 70 is propagated to the heat radiator 10 or 75 and then radiated from the heat radiator 10 or 75. Therefore, the heat transferred to the boards 26 from the LEDs 25 is more reliably transferred to the conductive units 20, 65, or 70, whereby the heat generated at the LEDs 25 is more reliably radiated. Accordingly, heat radiation is achieved more reliably and efficiently.

Moreover, the radiators 10 and 75 may have a divided or non-unitary structure. For example, the radiators 10 and 75 may be divided in the direction in which the light guide tube 28 extends, namely, in the width direction of the sheet conveyance path 5. Because both ends of the light guide tube 28 are held by the conductive units 20, 65, or 70, by dividing the heat radiator 10 or 75 and assembling together the divided heat radiators 10 or 75 that have been connected with the conductive units 20, 65, or 70 in the width direction of the sheet conveyance path 5 to connect the conductive units 20, 65, or 70 towards both ends of the light guide tube 28, it becomes easier to assemble the structure. Accordingly, the image reading apparatuses 1 and 50, which provide efficient heat radiation, can be easily assembled. This ease of assembly can reduce the production cost.

By thus structuring the heat radiators 10 and 75 divided, it is possible to assemble the LEDs 25 tightly to the light guide tube 28 towards both ends of the light guide tube 28. This allows almost all the light from the LEDs 25 to enter the light guide tube 28 when the LEDs 25 emit light. Therefore, the sheet 40 is efficiently irradiated with the light emitted from the LEDs 25 when an image is read from the sheet 40. Consequently, it is possible to improve the irradiation efficiency while efficient heat radiation is achieved with the simple configuration.

While the LEDs 25 are used as light sources for the image reading apparatuses 1 and 50, the light sources are not limited to the LEDs 25, and may be cold cathode tubes (not shown), for example. To use cold cathode tubes as the light sources, holding portions (not illustrated) of the cold cathode tubes are connected to the conductive units 20, 65, or 70. Accordingly, heat generated upon light emission by the cold cathode tubes is transferred to the conductive units 20, 65, or 70 from the holding portions, propagated to the heat radiator 10 or 75 from the conductive units 20, 65, or 70, and then radiated by the heat radiator 10 or 75, thereby suppressing an excessive increase in the temperature of the cold cathode tubes. As a result, efficient heat radiation is achieved with this simple configuration.

While the heat radiators 10 and 75 radiate the heat generated at the light sources in the image reading apparatuses 1 and 50, the heat to be radiated by the radiators 10 and 75 is not limited to the heat generated at the light sources, such as the LEDs 25. For example, the radiators 10 and 75 may radiate heat generated at control circuits (not illustrated) used for controlling the image reading apparatuses 1 and 50, or at various types of motors, such as motors for the paper feeding rollers 15 (not illustrated). The control circuits and other heat sources may be connected to the heat radiator 10 or 75 via the conductive units 20, 65, or 70 like the light sources, or instead directly connected to the heat radiator 10 or 75. By thus connecting the heat sources like the control circuits indirectly or directly to the heat radiator 10 or 75, the heat radiator 10 or 75 radiates the heat generated at the heat sources. As a result, even when heat sources other than the light sources like the LEDs 25 are used, efficient heat radiation is achieved with a simple configuration.

The components included in the image reading apparatuses 1 and 50 according to the first embodiment, the second embodiment, and the modified examples may be used in combination. By combining the components as appropriate depending on usage or manufacturing conditions of the image reading apparatuses 1 and 50, the image reading apparatuses 1 and 50 that are optimal for their usage or manufacturing conditions may be obtained.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image reading apparatus, comprising:
   a sheet conveyance path on which a sheet from which an image is to be read is conveyable;
   a light source that is configured to emit light to be irradiated on the sheet;
   a conductive unit through which heat generated at the light source is transferable; and
   a heat radiating unit that forms a part of the sheet conveyance path, through which the heat transferred from the light source to the conductive unit is propagable, and that is configured to radiate the heat propagated from the conductive unit to air flowing in the sheet conveyance path when the sheet is being conveyed.

2. The image reading apparatus according to claim 1, wherein the heat radiating unit includes at least one heat radiator fin on a sheet conveyance path side.

3. The image reading apparatus according to claim 2, wherein the at least one heat radiator fin extends along a conveyance direction of the sheet, and includes an inclined portion on an upstream end of the at least one heat radiator fin in the conveyance direction, wherein the inclined portion is inclined such that the inclined portion approaches the sheet being conveyed on the sheet conveyance path from upstream to downstream in the conveyance direction.

4. The image reading apparatus according to claim 2, further comprising a shielding member in the sheet conveyance path, wherein the shielding member includes at least one of a hole and a notch and is disposed on the heat radiating unit with the at least one heat radiator fin passing through the at least one of the hole or the notch.

5. The image reading apparatus according to claim 2, wherein the at least one heat radiator fin extends along a conveyance direction of the sheet, and includes a flat surface.

6. The image reading apparatus according to claim 1, further comprising:
   an upstream member positioned upstream of the heat radiating unit in a conveyance direction of the sheet,
   wherein the heat radiating unit includes an upstream end in the conveyance direction such that the upstream end is further away from the sheet being conveyed on the sheet conveyance path than the upstream member.

7. The image reading apparatus according to claim 6, wherein the upstream member includes a contact glass.

8. The image reading apparatus according to claim 1, wherein the conductive unit includes a heat pipe.

9. The image reading apparatus according to claim 1, wherein the conductive unit includes a graphite sheet.

10. The image reading apparatus according to claim 1, wherein the heat radiating unit includes thereon a flat surface extending along a conveyance direction of the sheet.

11. The image reading apparatus according to claim 1, wherein the heat radiating unit forms a part of the sheet conveyance path by facing the sheet conveyance path.

12. The image reading apparatus according to claim 1, wherein the heat radiating unit is directly contactable with the sheet being conveyed along the sheet conveyance path.

* * * * *